United States Patent
Terres Rojas et al.

(10) Patent No.: US 7,005,118 B2
(45) Date of Patent: Feb. 28, 2006

(54) SYNTHETIC MESOPOROUS MATERIAL WITH RADIALLY ASSEMBLED NANOTUBES

(75) Inventors: Eduardo Terres Rojas, Mexico City (MX); Jose Manuel Dominguez Esquivel, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 128 days.

(21) Appl. No.: 10/620,770

(22) Filed: Jul. 17, 2003

(65) Prior Publication Data

US 2004/0052714 A1    Mar. 18, 2004

Related U.S. Application Data

(60) Provisional application No. 60/398,115, filed on Jul. 25, 2002.

(51) Int. Cl.
*C01B 33/12* (2006.01)
*C01B 33/20* (2006.01)
*C01B 33/26* (2006.01)

(52) U.S. Cl. ............... 423/702; 423/328.1; 423/328.2; 423/716

(58) Field of Classification Search ............... 423/335, 423/702, 716, 328.1, 328.2
See application file for complete search history.

(56) References Cited

U.S. PATENT DOCUMENTS

| | | | |
|---|---|---|---|
| 5,098,684 A | 3/1992 | Kresge et al. | |
| 5,220,101 A | 6/1993 | Beck et al. | |
| 5,579,140 A | 11/1996 | Yamahara et al. | |
| 5,670,438 A | 9/1997 | Badley | |
| 5,712,037 A | 1/1998 | Anderson et al. | |
| 5,942,208 A * | 8/1999 | Ryoo et al. | 423/705 |
| 5,951,962 A | 9/1999 | Muller et al. | |
| 6,096,469 A * | 8/2000 | Anderson et al. | 430/119 |
| 6,174,512 B1 * | 1/2001 | Kosuge et al. | 423/705 |
| 6,319,486 B1 * | 11/2001 | Mou et al. | 423/702 |
| 6,334,988 B1 * | 1/2002 | Gallis et al. | 423/326 |
| 6,620,402 B1 * | 9/2003 | Jacobsen et al. | 423/716 |
| 2001/0055562 A1 * | 12/2001 | Hasenzahl et al. | 423/700 |
| 2002/0197206 A1 * | 12/2002 | Balkus et al. | 423/702 |
| 2003/0031615 A1 * | 2/2003 | Satou et al. | 423/335 |

* cited by examiner

*Primary Examiner*—David Sample
(74) *Attorney, Agent, or Firm*—Roylance, Abrams, Berdo & Goodman, L.L.P.

(57) ABSTRACT

This invention relates to a new composition of high surface area materials suitable for adsorption of both organic and inorganic species and as a component of catalysts useful for the transformation of hydrocarbons into a variety of products. These materials are composed by mesoporous spherical particles that have large sorption capacity, as demonstrated by the uptake of nitrogen at 78 K having a diameter of 0.1 to 1.0 microns, a mean pore diameter of 2.0 nm to 4.0 nm, a surface area of 750 to 1050 $m^2/g$ and a mean pore volume of 0.75 to 1.0 ml/g. The typical inner structure is composed of nanotubes having diameters around 3.5 nm aligned along the radius of the spherical particles, with surface areas around 1,000 $m^2/g$, depending on the surfactant ($C_{16}H_{33}N(CH_3)_3Br$) to co-solvent ($C_nH_{2n+1}OH$, where n=2,3, or $CH_3COCH_3$) molar ratio. Elliptical particles are also obtained with cylindrical pores running along or across the major axis of the particles having very high surface areas of up to 1561 $m^2/g$ and a mean pore diameter of 2.0 to 4.0 nm. The walls of the nanotubes are pure silica or a composition of silica with $M(III)O_x$ where M is a trivalent metal such as Al, Ga, or lanthanide.

38 Claims, 3 Drawing Sheets

Figure 1A
Figure 1B
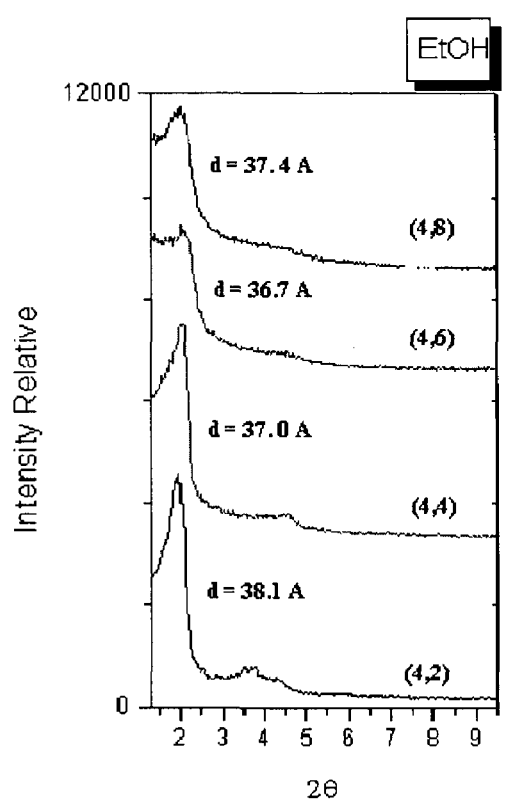
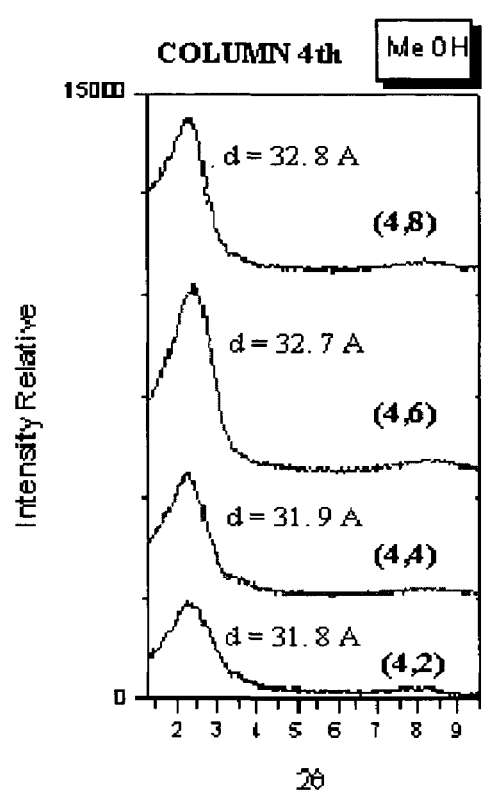

SYNTHETIC MESOPOROUS MATERIAL WITH RADIALLY ASSEMBLED NANOTUBES

CROSS-REFERENCE TO RELATED APPLICATION

This application claims the benefit under 35 U.S.C. § 119(e) of prior provisional application No. 60/398,115, filed Jul. 25, 2002, which is hereby incorporated by reference in its entirety.

FIELD OF THE INVENTION

The present invention is directed to synthetic mesoporous material particles having a spherical or elliptical shape. The invention is particularly directed to a process for producing a mesoporous silica or silica-metal oxide material having a spherical or elliptical shape.

BACKGROUND OF THE INVENTION

Mesoporous sieves having mean pores sizes in the range $2\ \text{nm} \leq D_p \leq 50\ \text{nm}$ are potentially useful materials for applications as catalysts components in the oil refining, petrochemical and chemical industries, mainly due to their wide open structure and intrinsic surface acidity. Mesoporous silica and silica-alumina based materials have been developed recently and tested for the selective separation of components in water-hydrocarbons and hydrocarbons mixtures. Other synthetic large sorption capacity silica and silica-alumina based materials having uniformly sized large pores arranged hexagonally have selective properties for benzene adsorption of up to 15 g/100 g at 50 torr and at 25° C. These materials are also suitable for the catalytic dealkylation of tri-tert-butylbenzene (TTB) to di-tert-butylbenzene at 225° C. WHSV=100 $h^{-1}$ or at 200° C. and 200 $h^{-1}$.

Other synthetic materials have been synthesized using surfactants in aqueous solutions, such as for example cetyltrimethylammonium bromide (CTAB) and poly(alkylene oxide) block copolymers. The typical pore array symmetries of these materials are hexagonal, cubic or lamellar, which correspond to MCM-41, MCM-48 and MCM-50 type structures, respectively. Other mesoporous sieves having larger pore diameters have been synthesized under acidic or neutral conditions, giving rise to SBA-15, MSU-H, Al-MSU-S or "wormhole-like" structures.

Micron- and sub-micron sized silica spheres with an amorphous inner structure were previously synthesized. When an organic surfactant is introduced, sub-micrometer sized particles having characteristics of the MCM-41 materials have been obtained. These materials have been used as GC stationary phases. Recently, TEM techniques were applied for verifying the formation of spherical MCM-41 particles of 0.2 to 1.0µ diameter having an ill-ordered hexagonal structure and a spherical distribution of pores with an hexagonal packing on a local scale. When octylamine is introduced in the batch synthesis a disordered "wormhole-like" pore structure forms into the large 30 to 50µ diameter silica hard spheres.

Other developments have led to synthesis of spherical MCM-48 type materials from novel routes based on the modified Stöber modified method used for obtaining non-porous silica. These developments have led to catalysts composed of discrete silica and silica-metal oxide particles containing aluminum, gallium, niobium, vanadium or chromium, the latter also being used for the polymerization of low molecular weight olefins. Other mesoporous silica based materials prepared by the cationic polymer dispersion in water reaction medium or using sol-gel methods have surface areas of about 500 $m^2/g$. However, in these cases no specific details were disclosed on the particle morphology or their inner pore structure.

One example of a catalyst comprising discrete silica particles is disclosed in U.S. Pat. No. 5,670,438 to Bradley. The catalyst composition is produced by contacting a catalyst support with a colloidal suspension of a tetraalkyloxysilane, an alcoholic composition, an ammonia composition and water. The catalyst support contains a chromium compound.

U.S. Pat. No. 5,951,962 to Muller et al. discloses a mesoporous silica having a specific surface area of 500 $m^2/g$ and a volume of the mesopores of 1.0 ml/g. The mesoporous silica is produced by converting a silica precursor in the presence of a polymer dispersion. The resulting silica particles have pores with an average pore diameter of 2–50 nm.

U.S. Pat. No. 5,712,037 to Anderson et al. discloses a method of producing a high surface area microporous ceramic material by replacing a portion of the silicon in a sol or gel that contains silica with cations of a metal. The substituted sol or gel is then converted into a porous ceramic material by evaporating the solvent and calcining the support. The microporous materials have a mean pore diameter of less than 20 angstroms.

U.S. Pat. No. 5,098,684 to Kresge et al. discloses an ultra-large pore crystalline material having a hexagonal arrangement of uniformly-sized pores. The pores are disclosed as having a diameter of at least 15 angstroms.

The prior porous particles and process for producing the particles have been generally effective for the intended use. However, there is a continuing need in the industry for improved porous materials and methods of producing the materials.

SUMMARY OF THE INVENTION

This invention relates to a composition of synthetic mesoporous materials formed from silica and/or silica-metal oxides and to a process for producing the mesoporous materials. The preferred silica-metal oxides include $SiO_2$—$Al_2O_3$, $SiO_2$—$Ga_2O_3$ and $SiO_2$—$La_2O_3$. In one embodiment, the mesoporous particles are spherical particles with diameters between about 0.1 and 1.0 microns, and have an inner structure formed by close-packed nanotube-like structures extending radially outward from the center of the particles. The pores of the nanotube-like structure have a mean diameter of about 3.5 nm.

The invention is also directed to a method for the synthesis of mesoporous elliptical shaped particles and the elliptical shaped particles having unidirectional pores with a mean pore size between about 2.0 and 2.5 nm. The spherical and elliptical mesoporous particles have very high surface areas. The spherical particles have a surface area of between about 750 and about 1,050 $m^2/g$. The elliptical particles have a surface area of between about 1,000 and about 1561 $m^2/g$. The particles are suitable for catalysts, separation media and adsorbents for various chemical species.

One aspect of the invention is to provide a process for producing silica and silica-metal oxide based mesoporous particles by preparing an aqueous mixture of a silica-source, a surfactant, a hydrolysis catalyst and a cosolvent to form a gel. The cosolvent is added in an amount to lower the surface tension and the dielectric constant of the aqueous mixture. The amount and molar ratio of the cosolvent to the amount of surfactant is selected to determine the shape of the resulting mesoporous particles. The gelled mixture is dried and then calcined to produce the mesoporous particles.

Another aspect of the invention is to provide a process for producing mesoporous particles in an aqueous system by adding a polar cosolvent to lower the surface tension and dielectric constant of the aqueous system. The specific cosolvent is selected to produce the desired particle shape and size of the mesoporous particles.

A further aspect of the invention is to provide a process for producing substantially spherical shaped particles in an aqueous system by the addition of a lower alcohol in an amount to produce the spherical mesoporous particles. In one embodiment, the cosolvent is ethanol or propanol.

Another aspect of the invention is to provide a process for producing substantially elliptical shaped particles in an aqueous system by the addition of a high protic cosolvent, a polar lower alcohol or an aprotic low molecular weight cosolvent. In one embodiment, the elliptical shaped particles are produced using methanol or acetone as the cosolvent.

The aspects of the invention are further attained by providing silica or silica-metal oxide based mesoporous particles having a surface area of about 1050 m$^2$/g, a pore volume of about 0.75 cc/g and a mean pore size of about 3.5 nm.

Still another aspect of the invention is to provide a process for producing silica and silica-metal oxide based mesoporous particles from aqueous systems containing a cosolvent and a surfactant by selectively adjusting the molar ratio of the surface to the cosolvent to produce the mesoporous particles having a predetermined shape, pore size and surface area.

The various aspects of the invention are basically attained by providing a mesoporous material comprising spherical silica particles having a diameter of between 0.1 and 1.0 micron. The silica particles have an inner structure formed by chain stacks. Each of the chain stacks have pores interconnected with pores of an adjacent chain stack to form a nanotube structure having a mean pore diameter between about 2.0 nm and about 4.0 nm, as measured by nitrogen adsorption. The spherical particles have a surface area between about 750 and about 1,050 m$^2$/g and a mean pore volume between about 0.75 ml/g and about 1.0 ml/g.

The aspects of the invention are further attained by providing a mesoporous material comprising silica particles having an elliptical shape with a major axis and a minor axis. The silica particles have an inner structure formed by chain stacks. Each of the chain stacks has pores interconnected with pores of an adjacent chain stack to define a plurality of nanotubes. The nanotubes have a mean pore diameter of about 2.0 nm to about 4.0 nm.

The aspects of the invention are also attained by providing a process for producing silica particles comprising the steps of: reacting an aqueous mixture of a surfactant, an organic cosolvent, an hydrolysis catalyst agent and a silica source to form a gel, wherein the surfactant and cosolvent are present in a molar ratio of about 0.001:1 to about 0.01 to 1; and calcining the gel to form silica particles having an inner structure formed by chain stacks. Each of the chain stacks has pores interconnected with pores of an adjacent chain stack to define a plurality of nanotubes. The nanotubes have a mean pore diameter of about 2.0 nm to about 4.0 nm.

These and other aspects of the invention will become apparent from the following detailed description of the invention, which disclose various embodiments of the invention.

BRIEF DESCRIPTION OF THE DRAWINGS

The following is a brief description of the drawings, in which:

FIG. 1A is an x-ray diffraction pattern of mesoporous particles made with ethanol as a cosolvent;

FIG. 1B is an x-ray diffraction pattern of mesoporous particles made with methanol as a cosolvent;

DETAILED DESCRIPTION OF THE INVENTION

Figure 2:
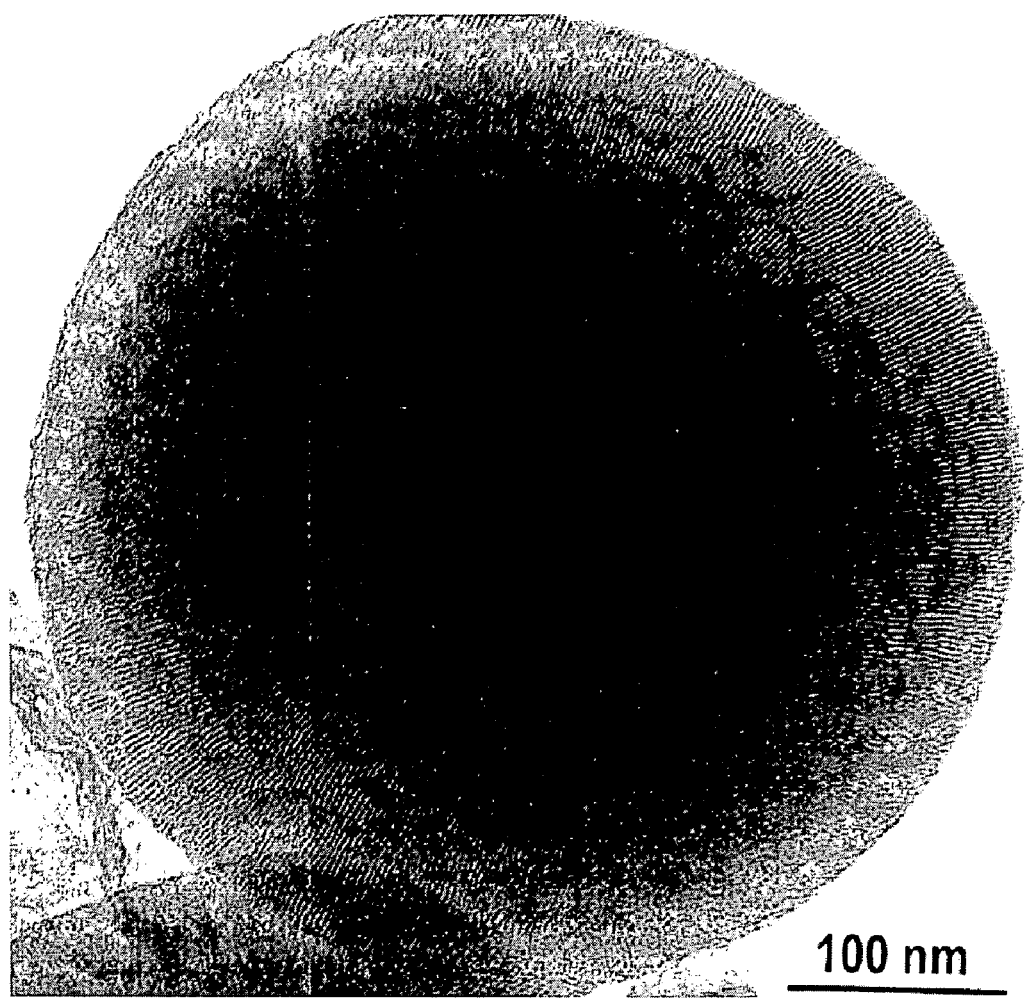
FIG. 2 is an electron microscope micrograph of a spherical particle.
Figure 3:
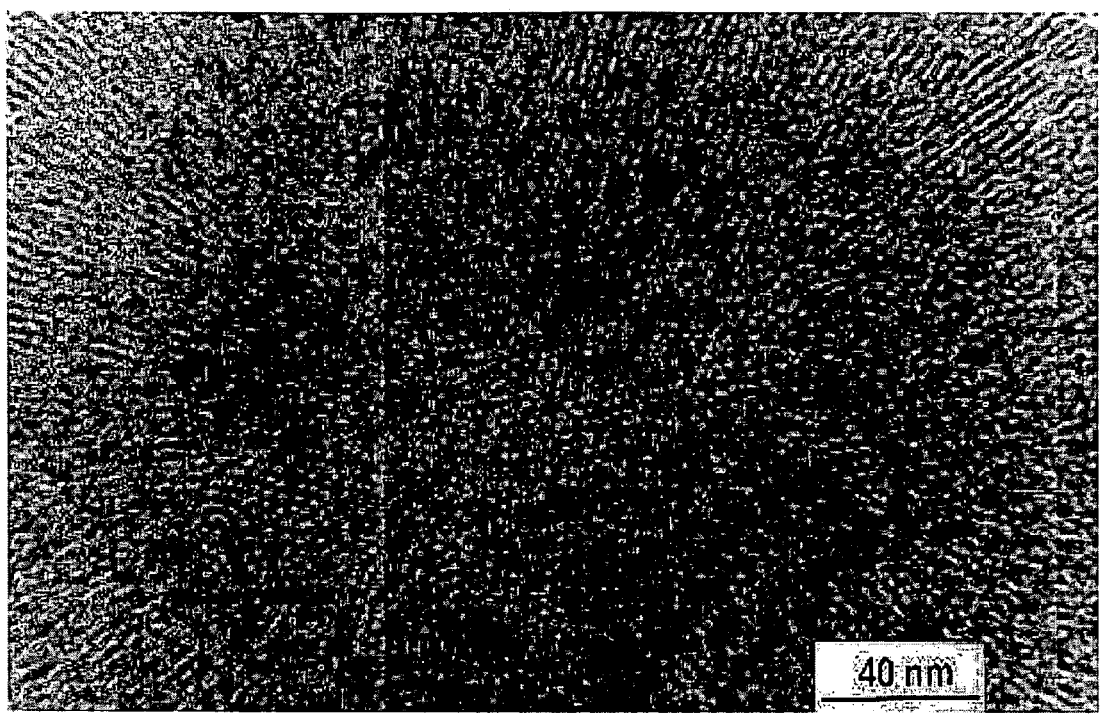
FIG. 3 is an enlarged view of the electron microscope micrograph of FIG. 2.

The present invention is directed to mesoporous materials and to methods for preparing sub-micrometer sized silica and silica-based mesoporous materials. The surface of the particles have an intrinsic acidic property. In one embodiment, the particles have a spherical morphology and an inner structure consisting of a nanotube structure with pores oriented along the radius of the spherical particles. The spherical particles have a very high surface area.

The mesoporous materials are obtained from a surfactant/ H$_2$O/organosilicate system by the incorporation of short-chain polar co-solvents, such as lower alcohols. The cosolvent changes the surface tension ($\gamma$) and the dielectrical constant ($\in$) of the aqueous system, thus leading to mesoporous particles or sieves having novel surface textures and novel structures, shapes and pore size. The texture and structure of the resulting mesoporous particles are verified by X-ray diffraction, transmission electron microscopy and N$_2$-adsorption methods. These properties vary according to the nature of the co-solvent and the molar ratio of the surfactant and the cosolvent in the system. In one embodiment elliptically shaped particles having unidirectional channels or pores are produced by using higher protic cosolvent and polar lower alcohols, or aprotic low molecular weight co-solvents in the aqueous system. The lower alcohols preferably have 1–3 carbon atoms.

According to one embodiment of the present invention the mesoporous materials are obtained from a silica source selected from the group consisting of organosilicates, silica and silica metal oxides and mixtures thereof. The silica metal oxides are represented by the formula SiO$_2$MO$_x$ where M is a trivalent metal. In one embodiment, the mesoporous materials have surface areas of about 1,050 m$^2$/g, pore volume around 0.75 cc/g and pore size around 3.5 nm. In one embodiment, the trivalent metal is Al(III), Ga(III), Ln(III) or other trivalent lanthanide metal where the metal is present as a trivalent metal oxide. One example of a suitable organosilicate is tetraethylorthosilicate although other organosilicates can be used. In another embodiment, the silica source is sodium metasilicate.

The silica source can be a mixture of silica and a trivalent metal oxide, nitrate or chloride. For example, aluminum can be present as aluminum nitrate (Al(NO$_3$)$_3$). The trivalent metal can also be present in the form of an oxide, such as alumina (Al$_2$O$_3$), gallium oxide (Ga$_2$O$_3$) and lanthanum oxide (La$_2$O$_3$). Other sources of trivalent metals include sodium aluminate, sodium gallate, a lanthanide metal nitrate, a lanthanide metal chloride and mixtures thereof.

According to another embodiment of the present invention the silica and silica-M$_2$O$_3$ (M=Al(III), Ga(III) or Ln(III) where Ln is a Lanthanide metal) based mesoporous materials are produced in an aqueous system containing hexadecyltrimethyl-ammonium bromide as a surfactant (CTAB) and a lower alcohol in a molar ratio of about 0.009 to about 0.006 to produce substantially spherical particles. The resulting mesoporous materials are spherical shaped particles with diameters within the size range of between about 0.1 to about 1.0 microns. The spherical mesoporous particles have an internal structure with a plurality of pores or nanotube-like structures aligned along the radius of the spherical shaped particle. In one embodiment, the spherical shaped particles have a surface area of about 1,050 m$^2$/g, a pore volume around 0.75 cc/g, and a pore size of about 3.5 nm.

The mesoporous particles of the invention are obtained from an aqueous reaction mixture containing a silica source, an organic cosolvent, a surfactant and a silica hydrolysis catalyst in amounts to form a gel. The resulting gel is dried to remove the water and the cosolvent to form a dried product. The dried product is then calcined to form the mesoporous particles. The silica source can be silica, a silica metal oxide complex or an organosilicate and mixtures thereof The silica hydrolysis catalyst can be any suitable catalyst that is capable of hydrolyzing silica precursors and forming a gel. Typically, the catalyst is ammonium hydroxide. The cosolvent is preferably an organic cosolvent that is miscible in water. In one embodiment the cosolvent is selected from the group consisting of methanol, ethanol, propanol, butanol and acetone. In further embodiments, the cosolvent is a lower alkyl ketone where the alkyl group has 1–3 carbon atoms.

In an alternative embodiment, the mesoporous particles are produced from a reaction mixture consisting essentially of a silica source, a surfactant, a water miscible organic cosolvent and a hydrolysis catalyst. In another embodiment, the mesoporous silica particles are produced from a reaction mixture consisting essentially of a silica source, a source of a trivalent metal cation, a surfactant, a water miscible organic cosolvent and a hydrolysis catalyst.

It has been found that the specific cosolvent and the molar ratio of the surfactant to the cosolvent determine the shape, size and pore structure of the mesoporous particle. In one embodiment of the invention, substantially spherical particles are obtained where the aqueous reaction mixture includes ethanol, propanol or butanol as the cosolvent and where the molar ratio of the surfactant to cosolvent is about 0.008:1 to about 0.006:1. The molar ratio of the surfactant to hydrolysis catalyst to produce spherical mesoporous particles is preferably about 0.070:1 to about 0.09:1. Preferably, the spherical particles have pores extending in a radial direction as discussed hereinafter in greater detail.

Elliptical shaped particles having pores aligned along a major axis of the particles can be obtained by the process of the invention using methanol or acetone as a cosolvent in the aqueous reaction mixture in a molar ratio of surfactant to cosolvent of about 0.009:1 to about 0.023:1. It has been found that water miscible aprotic cosolvents produce elliptical shaped particles. Examples of cosolvents that can be used to produce elliptical mesoporous particles include diethyl ether, ethyl acetate, tetrahydrofuran, tetraglyme, methylene chloride, 2-propanol, acetone, ethylene glycol, acetonitrile, glycerol, formamide, N-methylformamide and mixtures thereof. It has been found that aprotic cosolvents in the process of the present invention product elliptical-shaped particles.

The elliptical mesoporous particles of the invention are produced in a similar manner as the spherical particles. An aqueous reaction mixture of a silica source, an organic, water-miscible cosolvent, a silica hydrolysis catalyst and a surfactant is produced to form a gel. Preferably, the gel is formed at room temperature. The gel is dried under mild conditions. Preferably, the gel is dried at a temperature of about 50° C. or less, and more preferably at a temperature of about 40° C. or less. The dried product is then calcined in an inert atmosphere, such as nitrogen, followed by calcining in air. The calcining step is generally at a temperature of about 500° C. to about 650° C. Generally, the dried material is calcined in an inert atmosphere for about 1 to 3 hours and then calcined in air for an additional 3–5 hours.

The process of the invention produces either spherical or elliptical shaped mesoporous particles depending on the cosolvent. The internal structure of the resulting particles are also affected by the type of cosolvent and the ratio of the cosolvent to surfactant. The resulting spherical mesoporous particles have a diameter of about 0.1 micron, a mean pore diameter of about 2.0 nm to 4.0 nm, typically about 3.5 nm as measured by nitrogen absorption, a surface area of about 750 to 1,050 m$^2$/g and a pore volume of about 0.75 ml/g to about 1.0 ml/g. The elliptical shaped mesoporous particles have a major axis and minor axis formed by chain stacks with interconnected pores to define a nanotube structure. The nanotubes have a mean pore diameter of about 2.0 nm to about 4.0 nm. The elliptical particles have a surface area of about 1200 m$^2$/g to about 1561 m$^2$/g, and a mean pore volume of about 0.75 ml/g. The nanotube structure, and thus, the pores, can extend in a direction parallel to or perpendicular to the major axis of the particle. Preferably, the pores are unidirectional.

According to another embodiment of the present invention, a method is provided for preparing mesoporous materials with particular inner structures and properties useful for applications in catalysis, adsorption and separation technologies. The mesoporous materials are produced from aqueous solutions of a surfactant such as hexadecyltrimethyl-ammonium bromide, silica and alumina, gallia and lanthana precursors and short-chain lower alcohols and an active agent or catalyst for promoting the hydrolysis and condensation of the silica compound and for controlling the pH of the aqueous mother solution. Suitable short chain lower alcohols include ethanol and propanol as the cosolvent. The general procedure uses a liquid handling robot for scanning the compositional coordinates using compositional libraries comprising the variation of the surfactant to lower alcohol ratio. Afterwards, the synthesis was scaled up and reproduced satisfactorily by conventional methods following a sequence comprising: (a) the formation of a homogeneous aqueous solution of the components to form a gel, (b) aging of the gels formed by the interaction of the organic and inorganic species in the aqueous solution, (c) drying the gel under mild conditions of temperature and pressure, and (d) calcining at high temperature. In one preferred embodiment, the calcining includes an initial step in an inert atmosphere and then a second calcining step in air.

According to one embodiment of the present invention, the mesoporous materials prepared according to the method of the invention have a texture and structure that depend on the surfactant to co-solvent ratio in the aqueous system where all of the other components remain constant. In another embodiment, the shape and structure of the mesoporous particles are determined by the surfactant to hydrolysis catalyst ratio. It has been found that the ratio of the surfactant to cosolvent has a greater affect than the ratio of the surfactant to hydrolysis catalyst. Suitable surfactant to co-solvent ratios include a molar ratio of from about 0.1:1 to about 0.001:1. A preferred hexadecyltrimethyl-ammonium bromide to ethanol molar ratio, for example, is between 0.008:1 to 0.006:1.

It has been found that the internal structure of the silica materials are influenced by the surfactant to cosolvent molar ratio and by the surfactant to hydrolysis-catalyst molar ratio. The cosolvents of the invention lower the surface tension and the dielectric constant of the aqueous system. The changes in the surface tension and the dielectric constant of the aqueous system affect the $Br^-$ counterion dissociation and the charge screening effects. The surface tension of the aqueous system is reduced linearly with an increase in the amount of the cosolvent added to the aqueous system. Changes in the surface tension and the dielectric constant produce changes in the interaction between the silica source and the surfactant and between the surfactant and the aqueous solvent media, which result in variations of the internal structure of the silica-surfactant aggregates. It has been found that the molar ratio of the surfactant to cosolvent have a greater influence on the internal structure of the resulting particles than the molar ratio of the surfactant to hydrolysis catalyst.

The molar ratio of the surfactant to cosolvent can be in the range of about 0.001:1 to about 0.1:1 to about 0.01:1. In one embodiment of the invention, the molar ratio of the surfactant to cosolvent is about 0.004:1 to about 0.01:1, and preferably about 0.006:1 to about 0.008:1. It has been found that the molar ratio of the surfactant to cosolvent in the range of 0.010:1 to about 0.1:1 results in substantially spherical shaped silica particles having an internal structure consisting of square arrays of circular pores. At a lower molar ratio of about 0.01:1 to 0.001:1, an IMP-1 structure is formed having a spherical shape with an internal structure defined by thin silica stacks ordered along the radius of the silica particle within the spherical shape forming radially oriented pores.

The amount of the surfactant in the aqueous system can vary depending on the desired shape and internal structure of the final silica particle and the compatibility of the surfactant with the cosolvent. The amount of the surfactant in the aqueous media is typically between about 1.0 wt % and about 8 wt % based on the weight of the aqueous media. In one embodiment, the amount of the surfactant in the aqueous media is about 3.0 wt % to about 6.0 wt %. In one preferred embodiment, the surfactant is present in the amount of about 4.0 wt % to about 5.0 wt %.

The amount of the silica source in the aqueous system can vary depending on the silica source and its solubility or dispersibility as well as the desired amount of the mesoporous silica particles to be produced. In one embodiment where the aqueous solution contains about 3.0 wt % to about 6.0 wt % of a surfactant, the silica source is included in an amount of 4.0 wt % to about 8.0 wt % based on the weight of the aqueous solution.

In a further embodiment the mesoporous particles are prepared by the general method described herewith using polar protic and aprotic co-solvents, such as methanol and acetone, respectively. In this process, the particle morphology of the resulting mesoporous particles have an elliptical shape. The texture and structure of the elliptical mesoporous particles are useful for various purposes and have ultra high surface areas above about 1,000 $m^2/g$ and up to about 1,561 $m^2/g$.

The mesoporous materials of the present invention are particularly useful as components of heterogeneous catalysts, as well as for sorption and separation media. The spherically shaped mesoporous particles having a high surface area of between about 750 and about 1,050 $m^2/g$, a pore volume around 0.75 cc/g and a narrow pore size distribution with a mean pore size of about 3.5 nm. The properties of the mesoporous particles are determined by nitrogen adsorption methods as known in the art. These materials are based on silica and silica-metal oxide, where the metal is a trivalent metal such as aluminum, gallium or a lanthanide metal. Also, the introduction of co-solvents such as methanol and acetone produce highly porous materials with a surface area of between about 1,000 and about 1561 $m^2/g$, pore volume around 0.75 cc/g, and mean pore diameters between 2.0 and 2.5 nm. The mesoporous materials can be prepared at room temperature. The process of the invention is faster than the traditional autoclaved process. The process of the invention is based on the Surfactant (CTAB)/$NH_4OH$ and Surfactant (CTAB)/Co-solvent ($C_nH_{2n+1}OH$, n=2,3 or $CH_3COCH_3$) molar ratios, which should reflect the systematic variation of both surface tension ($\gamma$) and dielectrical constant ($\in$) from pure water ($\gamma$=72 mJ $m^{-2}$, $\in$=78.3) to pure co-solvent ($\gamma$=22.8 mJ $m^{-2}$, $\in$=24.59 for $C_2H_5OH$, $\gamma$=22.5 mJ $m^{-2}$, $\in$=20.45 for $C_3H_7OH$, $\gamma$=23.0 mJ $m^{-2}$, $\in$=32.66 for $CH_3OH$ and $\gamma$=23.7 mJ $m^{-2}$, $\in$=20.56 for $CH_3COCH_3$).

Suitable ionic and non-ionic surfactants include, for example:

1. Cationic Surfactants
   Alkyl trimethylammonium Bromides
   $R_nN(CH_3)_3{}^+Br^-$, where n is an integer 10–18
   Alkyl trimethylammonium Chlorides
   $R_nN(CH_3)_3{}^+Cl^-$, where n is an integer 10–18
   Alkyl trimethylammonium Hydroxides
   $R_nN(CH_3)_3{}^+OH^-$, where n is an integer 10–18
   N-alkylpyridinium Chloride, where n is an integer 10–18

2. Anionic Surfactants
   Sodium Alkyl Sulfates
   $R_nSO_4{}^+Cl^-$, where n is an integer 8–16
   Sodium n-alkyl sulfonate where n is an integer 8–16
   Sodium n-alkylbenzene sulfonate, where n is an integer 8–16

3. Non-ionic Surfactants
   Alkyl polyethylene monoethers
   $R_n$—$(OCH_2CH_2)_6OH(C_nE_6)$, where n is an integer 6–14
   Alkylphenol polyethylene oxide
   Alkylenoxide copolymer systems
   (EO)n-(PO)m-(EO)n, where n and m are the same or different and are an integer 2–30.

One aspect of the invention is directed to the discovery that the selection of a specific cosolvent, the molar ratio of the surfactant to the cosolvent, and the ratio of the surfactant to the hydrolysis catalyst determines the shape, size and pore structure of the resulting mesoporous particle. More specifically, the molar ratio of the surfactant to the cosolvent and the selection of the cosolvent can produce either spherical or elliptical shaped mesoporous particles.

The mesoporous particles of the invention are prepared by a process of dispersing a silica source, a hydrolysis catalyst, a surfactant and a water miscible organic cosolvent in an aqueous media. The aqueous system is allowed to react at room temperature to form a gel. The gel is dried and then calcined. Preferably, the dried material is calcined at a suitable temperature as known in the art. In one embodiment, the dried material is calcined at a temperature of 550° C. in nitrogen followed by calcining in air.

The effect of the cosolvent and the molar ratio of the surfactant to the cosolvent were determined by experimentation. Several mesoporous particles were prepared and examined where the molar ratio of surfactant to cosolvent and the ratio of the surfactant to the hydrolysis catalyst were varied as shown in Table 1. Each mesoporous particle was prepared from an aqueous media containing the surfactant cetyltrimethylammonium bromide (CTAB, CAS 57.09.3 obtained from Aldrich Chemical Co.) in demineralized water and an organic cosolvent Tetraethylorthosilicate (TEOS, SiO[$C_2H_5OH$]$_4$, CAS 1336.24.6, Aldrich Chemical Co) as a silica source was combined with the aqueous media. Ammonium hydroxide was added as the hydrolysis catalyst ($NH_4OH$, CAS 1336.21.6, Aldrich Chemical Co.) and as a pH adjusting agent for the aqueous media. In a preferred embodiment, the reaction is carried out at room temperature. The ratio of the surfactant and silica source can be varied to attain the desired shape, size and structure of the mesoporous particles. In one embodiment, the aqueous media contains about 4.5 wt % of a surfactant and a molar ratio of the surfactant to silica source of 4.0:1 at a pH 11.5.

The process was repeated to produce 48 samples by adjusting the molar ratio of the surfactant and the hydrolysis catalyst and by adjusting the molar ratio of the surfactant to the cosolvent. The ratio for each sample is as indicated on Table 1. Referring to Table 1, the x-axis identifies six molar ratios of the surfactant (CTAB) to the hydrolysis catalyst ($NH_4OH$) where the molar ratio ranged from 0.091:1 to 0.068:1. The y-axis identifies the eight molar ratios of the surfactant (CTAB) to the cosolvent where the molar ratio ranged from 0.023:1 to 0.006:1. The samples were prepared using a constant molar ratio of the surfactant (CTAB) to the silica source (TEOS) of 4.0:1. Each of the samples having the molar ratio as in Table 1 were produced using methanol, ethanol, propanol and acetone as the cosolvent.

Table 1 represents a 6×8 library of the 48 silica mesoporous particles obtained. The specific samples are designated Sxy where x is an integer from 1–6 corresponding to the surfactant to hydrolysis catalyst ratio indicated in Table 1, and y is an integer from 1–8 corresponding to the surfactant/cosolvent ratio indicated in Table 1.

TABLE 1

Composition Library ($S_{xy}$ positions) design for the synthesis of Silica based mesoporous materials

| 4.5% wt. CTAB | | x CTAB/$NH_4OH$ (molar ratio) | | | | |
|---|---|---|---|---|---|---|
| CTAB/TEOS = 4 (molar ratio) | | 1 0.091 | 2 0.085 | 3 0.080 | 4 0.076 | 5 0.072 | 6 0.068 |
| CTAB Co-Solv. (molar ratio) | 0.023 0.016 0.013 0.010 0.009 0.008 0.007 0.006 | | S2,2 S2,4 S2,6 S2,8 | | S4,2 S4,4 S4,6 S4,8 | | S6,2 S6,4 S6,6 S6,8 |

After mixing the reagents at room temperature, a gel was usually obtained after a few minutes. The gel was then subsequently dried at 40° C. The dried gel was first calcined in nitrogen followed by calcining in air at 550° C. to obtain the final solid particles. The main properties of the mesoporous particulate materials were determined by x-ray diffraction (Siemens D-500 with $\lambda_{Cu}$ radiation of 1.54 Å), Transmission Electron Microscopy (Phillips-CM200) and $N_2$-Adsorption (Micromeritics ASAP-2000), and $^{29}$Si-NMR (MAS).

The external morphology of the mesoporous particles was verified by scanning electron microscopy. The inner structural features of the mesoporous particles were verified mainly by the x-ray diffraction peak profiles and high resolution transmission electron microscopy (TEM). By way of illustration, FIG. 1A and FIG. 1B show the x-ray diffraction peak profiles of the mesoporous particles having the molar ratio of the surfactant to cosolvent in column 4, of Table 1 ($S_{4y}$). FIG. 1A shows the x-ray diffraction of particles obtained from the CTAB/EtOH system and FIG. 1B shows the profile of the particles obtained from the CTAB/MeOH system. A prominent broad peak around 2° (2Θ) is observed in the figures, which corresponds to the periodicity range between 32 and 40.5 Å.

The mesoporous particles synthesized from the CTAB/EtOH and the CTAB/PrOH (propanol) systems exhibit broader x-ray diffraction peaks at lower CTAB/Co-Solvent ratios (FIG. 1A) than the x-ray diffraction peaks produced from CTAB/MeOH system (FIG. 1B) and CTAB/$CH_3COCH_3$ system. Where the cosolvent is methanol or acetone there is no additional broadening of the peak with different ratios of methanol while the x-ray diffraction peak profiles become sharper as the surfactant/cosolvent ratio decreases. This is in contrast to the peaks exhibited by the mesoporous particles prepared from the system using ethanol as the cosolvent. The presence of a single x-ray diffraction peak in all cases except those corresponding to the CTAB/EtOH and CTAB/PrOH systems indicates the formation of 1-D periodicity for the mesoporous particles. However, additional periodicities corresponding to (100) and (200) typical of MCM-48 type zeolites are apparent only on the solids obtained from the CTAB/EtOH and CTAB/PrOH systems at Surfactant (CTAB)/Co-solvent ratios corresponding to the ratio between S(4,1) and S(4,4), thus indicating either a 2-D/3-D symmetry or a long range order. However, a periodicity loss is definitely obtained when either the CTAB/$C_2H_5OH$ or CTAB/$C_3H_7OH$ ratios decrease (Table 1), as illustrated also in FIG. 1A.

The transmission electron microscopy images corresponding to the samples of column 4 of Table 1, specifically to the library compositions S(4,2) and S(4,4) of the series CTAB/EtOH and CTAB/PrOH, show the spherical particles with inner pores assembled in a 4-fold symmetry similar to MCM-48 zeolite type structures. However, at very low CTAB/EtOH and CTAB/PrOH ratios, at and below the S(4,6) position of Table 1, spherical particles are formed having a radial distribution of nanotubes, as illustrated by FIG. 2. In these mesoporous particles, the center of the sphere displays an hexagonal close packing of a cylindrical nanotube structure having pores extending radially outward along the radius of the sphere. The region around the edges displaying a side-view of the nanotube structure have a mean diameter of about 3.5 nm. This data is consistent with the type of close packing of nanotubes in a spherical distribution, following the radius of the sphere.

A higher resolution the transmission electron microscope image of FIG. 2 shows that the nanotubes extend outwards from the center of the sphere. The spherical mesoporous particles defined by a radial distribution of nanotubes are labeled here as IMP-1, in order to distinguish it from other types of structures. Similar spherical particle structures were obtained with the Surfactant (CTAB)/PrOH system, at and beyond the positions S(4,6) and S(4,8) of Table 1, respectively. The structural features similar to the IMP-1 type particles were observed, although a more disordered array of the nanotubes is observed.

In contrast to these spherical mesoporous particles, mesoporous particles synthesized from Surfactant (CTAB)/MeOH and Surfactant (CTAB)/Acetone systems within the ratio S(4,2) and S(4,6), according to the experimental library of Table 1, show elliptically shaped particles. The elliptical shaped particles are composed of a series of cylindrical pores running perpendicular to the major axis of the particle, with their silica walls weaving across the particle. In the elliptical particles, the cylindrical pores display a wall thickness of about 30 Å between adjacent pores. The wall thickness between adjacent pores provide high mechanical and structural stability to the solid mesoporous particles. The mesoporous particles of samples S(4,6) and S(4,8) in Table 1, which were synthesized from the Surfactant (CTAB)/MeOH and Surfactant (CTAB)/Acetone systems have elliptical shaped particles with inner cylindrical pores weaving across the particle, almost parallel to the major axis of the particles.

The surface area and texture of the mesoporous particles of the present invention were determined by nitrogen adsorption techniques according to conventional methods. Only incremental variations of the properties occur from one particle to another within the same cosolvent system. The surface areas were found to be between about 750 and about 1,050 $m^2/g$ for the mesoporous particles prepared from CTAB/EtOH and CTAB/PrOH. These mesoporous solids have a mean pore diameter between 3.2 and 3.5 nm. The surface area of the mesoporous particles obtained from the methanol and acetone cosolvent systems were between about 1,000 and about 1,561 $m^2/g$. These particles had a mean pore diameter of about 2.0 to about 2.5 nm. The typical pore volume was between 0.6 to 0.85 cc/g for all of the particles.

The spherical mesoporous particles are composed of thin silica chain stacks aligned along the radius of the sphere, which form straight pores of about 3.5 nm diameter. The electron microscopy micrographs shows transverse pores between one stack end and an adjacent stack, which leads to an interconnecting pore system in the sphere. The nanotubes are not discrete, but form beams that result from the association of the silica chain stacks. Without being limited to any theory, each silica stack may separate two neighboring pores and, at a very local scale, the silica stacks may change their orientation slightly, or even can rotate a few degrees with respect to the main direction along the radius. In turn, the array provides a relaxation of the structure, thus giving rise to higher stability. This is in contrast to a rigid structures composed of single nanotubes.

The present invention provides an important advance with respect to the prior processes and particles in the field of new materials. The particles are suitable for use as components of catalysts, sorbents and separation media. In particular, these materials can be used as catalyst supports or catalysts by themselves, depending on the specific reaction. For example, low temperature isomerization of light alkanes requiring acidic surface centers and a metallic dehydrogenating-hydrogenating active phase, such as platinum or nickel, can be carried out by contact with the specific reactants with the impregnated mesoporous materials of the invention. For example, the isomerization of $C_5$ to $C_7$ hydrocarbons can be carried out at temperatures between 180° C. and 250° C., at atmospheric pressure. Also, the texture of the mesoporous particles are adequate for preparing advanced catalysts for a number of catalytic processes operating under mild conditions of temperature and pressure, preferably under 400° C. and less than 60 atmospheres.

The exposure of these materials to environmental vapors, including water, is not expected to modify their structural properties, except in the case where high temperatures prevail, i.e. T>400° C. and 100% vapor saturation. However, the surface acidity and chemical resistance of the mesoporous materials can be enhanced by chemical treatments, surface coatings and thermal treatments. The lower olefin polymerization reactions can proceed, for example, at temperatures ranging between 90° C. and 110° C. and 550 psig of pressure.

Hydrocracking of complex molecules, such as those present in heavy oil feedstock or residuals, can be carried out on catalysts composed by the mesoporous materials of the invention. The wide open porous structure and high surface area are suitable for hydrocracking complex molecules. The mesoporous particles of the invention can be used in the catalytic transformation of hydrocarbons into lower alkanes and particularly lower alkanes having 3–8 carbon atoms. The mesoporous particles can also be used as catalysts the catalytic hydrocracking of petroleum feedstocks or naphtha into distillates and fuels such as gasoline and diesel. The traditional zeolite based catalysts have a much lower pore size. Also, the outstanding textural properties of these mesoporous materials as well as their mild surface acidity are adequate for adsorption and diffusion of gaseous chemical species. For example, the mesoporous particles can be used as a stationary phase of chromatographic columns for the separation of gas mixtures, and for environmental cleaners of noxious gases, etc. Other applications include the adsorption of gases and vapors of industrial interest, including lower alcohols, olefins and lower alkanes, water, aromatic compounds of industrial interest such as benzene and xylenes. The invention will be further illustrated by the following non-limiting examples, which demonstrate various embodiments of the invention.

EXAMPLE 1

An aqueous solution of 4.5 wt % CTAB with a concentration of $0.49245 \times 10^{-3}$ M Cetyltrimethylammonium Bromide, equivalent to 4.5 wt % CTAB, was prepared in demineralized and deionized water ($208.3 \times 10^{-3}$ M), then $60 \times 10^{-3}$ M $C_2H_5OH$ or $C_3H_7OH$ were added and $6.47 \times 10^{-3}$ M ammonium hydroxide was included afterwards, then $1.20 \times 10^{-3}$ M Tetraethylorthosilicate was included. After a few minutes, a translucent gel is formed, then drying it at 40° C. for 8 h, before calcination at 550° C. in $N_2$ for 2 h, then in air during 4 h. The reagent concentrations can be easily scaled up for obtaining higher yields. A $CTAB/NH_4OH$ molar ratio equal to 0.076:1 and the CTAB/Co-solvent ($C_2H_5OH$ or $C_3H_7OH$) molar ratio of 0.0082:1 lead to materials constituted by spherical silica particles having an inner structure constituted by assembled nanotubes of about 3.5 nm diameter, as verified by XRD and TEM techniques, illustrated by FIG. 1 and FIG. 2 herewith.

EXAMPLE 2

An aqueous solution of 4.5 wt % Cetyltrimethylammonium bromide (CTAB) was prepared from 0.18 g of CTAB in 3.75 ml of $H_2O$, which was aggregated by injection using a liquid handling robot, for obtaining a complete library having compositions as those illustrated by Table 1 herewith, followed by variable amounts of ethanol (99%, CAS 64-17-5), for completing the entire series of CTAB/EtOH ratios specified in Table 1 herewith, as well as the necessary amounts of $NH_4OH$ (28%, CAS 1336-21-5) as specified in Table 1, together with 0.25 g of tetraethylorthosilicate (TEOS 98%, CAS 78-10-4), 1.24 to 0.15 g of $Al(NO_3)_3$ or 0.851 g to 0.106 g of $Ga(NO_3)_3$, or 1.085 to 0.135 g of $La(NO_3)_3$ in a sequential mode, for obtaining a Si/M (M=Al, Ga,La) from 12.5 to 100. The resulting wells containing the mixtures were heated at 40° C. for 2 h, then were evaporated until dryness at 40° C. in an oven. The gel was calcined at 550° C. for 2 h under nitrogen and 4 in air. The composition of the gel was as follows:

0.49245×10$^{-3}$ mol CTAB
64×10$^{-3}$ mol Ethanol
6.47×10$^{-3}$ mol NH$_4$OH
208.3×10$^{-3}$ mol H$_2$O
3.33×10$^{-3}$ mol to 4.161×10$^{-4}$ mol of M (M=Al,Ga,La).

The molar ratio of the surfactant to cosolvent was about 0.0076:1 and the molar ratio of surfactant to hydrolysis catalyst was about 0.076. This composition corresponded to about the position of $S_{46}$ of Table 1.

The resulting mesoporous spherical particles were shown to have a surface area of 835 m$^2$/g, a pore volume of 0.76 ml/g and a mean pore diameter of 3.3 nm. The x-ray diffraction pattern corresponding to the calcined product is one of those shown in FIG. 1A, which presents a strong and broad peak at 3.67 nm and a particle morphology illustrated in FIG. 2.

EXAMPLE 3

An aqueous solution containing 187.5 ml with 4.5 wt % CTAB was prepared and 147 g of ethanol (99%, CAS 64-17-5) were added together with 11.5 grams of NH$_4$OH (28%, CAS 1336-21-5) and 12.5 g of tetraethylorthosilicate (TEOS 98%, CAS 78-10-4) with stirring for 2 h. This gel had a composition as follows:

0.025 mol CTAB
3.2 mol Ethanol
0.3235 mol NH$_4$OH
10.42 mol H$_2$O

The molar ratio of the surfactant to the cosolvent was about 0.078:1 and the ratio of the surfactant to the hydrolysis catalyst was about 0.077. The resulting solid was recovered by filtration and dried under vacuum. The product was calcined at 550° C. for 2 h under nitrogen and then 4 h in air.

This product proved to have a surface area of 890 m$^2$/g, a pore volume of 0.77 ml/g and a mean pore diameter of 3.43 nm. The X ray diffraction pattern corresponding to this product is illustrated in FIG. 1A. The inner structure of this material is constituted by mesoporous spherical particles containing a nanotube structure with pores aligned assembled as indicated in FIG. 2.

EXAMPLE 4

A solution containing 4.5 wt % CTAB was prepared as in Example 1, then 3.73 g of ethanol (99%, CAS 64-17-5) were added, followed by 0.23 g of NH$_4$OH (28%, CAS 1336-21-5) and 0.25 g of tetraethylorthosilicate (TEOS 98%, CAS 78-10-4) in a sequential order. The resulting mixture was heated at 40° C. in a closed vial for 2 h, then was evaporated mildly at 40° C. in an oven. The mixture had a composition in moles as follows:

0.49245×10$^{-3}$ mol CTAB
81×10$^{-3}$ mol Ethanol
6.47×10$^{-3}$ mol NH$_4$OH
208.3×10$^{-3}$ mol H$_2$O The molar ratio of the surfactant to the cosolvent was about 0.006:1 and the ratio of the surfactant to the hydrolysis catalyst was about 0.076:1. The resulting solid was then calcined at 550° C. for 2 h under nitrogen, followed by 4 h in air. The calcined product was spherical shaped particles, mesoporous particles having a surface area of 876 m$^2$/g, a pore volume of 0.76 cc/g and a mean pore diameter of 3.4 nm. The x-ray diffraction pattern of the calcined product corresponded to one of those shown in FIG. 1A, which presents a broad peak with a maximum at 3.74 nm.

EXAMPLE 5

A solution containing 187.5 ml with 4.5 wt % CTAB was prepared and 186.5 g of ethanol (99%, CAS 64-17-5) were added, together with 11.5 g of NH$_4$OH (28%, CAS 1336-21-5) and 12.5 g of tetraethylorthosilicate (TEOS 98%, CAS 78-10-4) under stirring for 2 h. This mixture had a composition as follows:

0.025 mol CTAB
4.05 mol Ethanol
0.3235 mol NH$_4$OH
10.42 mol H$_2$O

The molar ratio of the surfactant to cosolvent was about 0.006:1 and the molar ratio of the surfactant to hydrolysis catalyst was about 0.077:1. The resulting solid was recovered by filtration, then dried under vacuum. The product was calcined at 550° C. for 2 h under nitrogen, then in air during 4 h.

The calcined product proved to have a surface area of 855 m$^2$/g, a pore volume of 0.73 ml/g, and a mean pore diameter of 3.56 nm. The x-ray defraction profile is illustrated by FIG. 1A. The particle shape and inner structure are similar to FIG. 2. The resulting mesoporous spherical particle had pores extending radially outward from the center of the particles.

EXAMPLE 6

A solution containing 4.5 wt % CTAB was prepared in 3.75 ml of demineralized water as in Example 1, using a liquid handling robot similar to Example 2. Then, in a specific well of the library, a series of compounds were injected, such as 1.8 g of propanol (99%, CAS 71-23-8), 0.23 g of NH$_4$OH (28%, CAS 1336-21-5) and 0.25 g of tetraetylortosilicate (TEOS 98%, CAS 78-10-4). The resulting gel was heated at 40° C. for 2 h, then it was dried by evaporation at 40° C. in an oven. The overall composition was as follows:

0.49245×10$^{-3}$ mol CTAB
30×10$^{-3}$ mol Propanol
6.47×10$^{-3}$ mol NH$_4$OH
208.3×10$^{-3}$ mol H$_2$O The molar ratio of the surfactant to the cosolvent particles had a substantially spherical shape with pores extending radially outward from the center of the particle. The resulting solid was then calcined at 550° C. for 2 h under nitrogen and 4 h in air. The final product proved to have a surface area of 993 m$^2$/g, a pore volume of 0.86 ml/g, and a mean pore diameter of 3.4 nm. The x-ray diffraction pattern of the calcined product is similar to those illustrated by FIG. 1A, with a broad peak having a maximum at 3.56 nm and a particle morphology and inner structure similar to FIG. 2 herewith.

EXAMPLE 7

An aqueous solution containing 187.5 ml with 4.5 wt % of CTAB was prepared and 90.15 g of propanol (99%, CAS 71-23-8) were added together with 11.5 g of NH$_4$OH (28%, CAS 1336-21-5) and 12.5 g of tetraethylorthosilicate (TEOS 98%, CAS 78-10-4) under stirring for 2 h. This gel had a composition as follows:

0.025 mol CTAB 1.5 mol Propanol 0.3235 mol NH$_4$OH 10.42 mol H$_2$O

The molar ratio of surfactant to the cosolvent is about 0.0167:1 and the molar ratio of the surfactant to the hydrolysis catalyst is about 0.077:1. The resulting solid was recovered by filtration and dried under vacuum. The product was calcined at 550° C. for 2 h under nitrogen, then in air for 4 h.

The calcined product proved to have a surface area of 822 m$^2$/g, a pore volume of 0.73 ml/g, and a mean pore diameter of 3.5 nm. The x-ray diffraction pattern of this material is similar to those illustrated by FIG. 1A, while TEM indicated a structure similar to FIG. 2. The resulting spherical mesoporous particles had pores extending radially outward from the center of the particles.

EXAMPLE 8

A solution containing 4.5 wt % of CTAB was prepared as in Example 1, using a liquid handling robot as in Example 2, then 2.82 g of propanol (99%, CAS 71-23-8), 0.23 g of NH$_4$OH (28%, CAS 1336-21-5) and 0.25 g of tetraethylorthosilicate (TEOS 98%, CAS 78-10-4) were injected to the former solution sequentially. The resulting mixture was heated at 40° C. in closed vial for 2 h, afterwards it was evaporated until dryness at 40° C. in an oven. The gel had an overall composition as follows:

0.49245×10$^{-3}$ mol CTAB

81×10$^{-3}$ mol Propanol 6.47×10$^{-3}$ mol NH$_4$OH 208.3×10$^{-3}$ mol H$_2$O The molar ratio of the surfactant to cosolvent was about 0.006:1 and the molar ratio of the surfactant to hydrolysis catalyst was about 0.076:1. The resulting solid was then calcined at 550° C. for 2 h under nitrogen, followed by 4 h in air. The calcined product proved to have a surface area of 1043 m$^2$/g, a pore volume of 0.91 ml/g, and a mean pore diameter of 3.5 nm. The calcined product presented a broad x-ray peak centered at 3.88 nm. The resulting mesoporous particles had a spherical shape and pores extending radially outward from the center of the particles.

EXAMPLE 9

An aqueous solution containing 187.5 ml and 4.5 wt % CTAB was prepared and 243.4 g of propanol (99%, CAS 71-23-8) were added together with 11.5 grams of NH$_4$OH (28%, CAS 1336-21-5) and 12.5 g of tetraethylorthosilicate (TEOS 98%, CAS 78-10-4) under stirring for 2 h. The gel formed had a composition given by:

0.025 mol CTAB 4.05 mol Propanol 0.3235 mol NH$_4$OH 10.42 mol H$_2$O

The resulting solid was recovered by filtration and dried in vacuum. The product was calcined at 550° C. for 2 h under nitrogen, then in air for 4 h.

The calcined product proved to have a surface area of 754 m$^2$/g, a pore volume of 0.65 ml/g and a mean pore diameter of 3.4 nm. The x-ray diffraction profile is similar to those illustrated by FIG. 1A, while the particle shape and inner structure are similar to FIG. 2.

EXAMPLE 10

A solution containing 4.5 wt % of CTAB was prepared as in Example 1 and 1.0 g of methanol (99%, CAS 67-56-1), 0.23 g of NH$_4$OH (28%, CAS 1336-21-5) and 0.25 g of tetraethylorthosilicate (TEOS 98%, CAS 78-10-4) were added sequentially. The resulting gel was heated at 40° C. in a closed vial for 2 h, then it was evaporated at 40° C. in an oven. The mixture had a composition as follows:

0.49245×10$^{-3}$ mol CTAB

30×10$^{-3}$ mol methanol 6.47×10$^{-3}$ mol NH$_4$OH 208.3×10$^{-3}$ mol H$_2$O The molar ratio of the surfactant to the cosolvent was about 0.006:1 and the molar ratio of the surfactant to the hydrolysis catalyst was about 0.076:1. The resulting solid was then calcinced at 550° C. for 2 h under nitrogen, followed by 4 h in air. The calcined product presented a surface area of 1352 m$^2$/g, a pore volume of 0.77 ml/g and a mean pore diameter of 2.3 nm. The calcined product of this example exhibited an x-ray peak centered at 3.28 nm, as illustrated by FIG. 1B herewith, while the particle shape was elliptical and the inner structure was characterized by 1-D channels running along the particle longer axis.

EXAMPLE 11

An aqueous solution containing 187.5 ml with 4.5 wt % CTAB was prepared and 49.58 g of methanol (99%, CAS 71-23-8) were included together with 11.5 g of NH$_4$OH (28%, CAS 1336-21-5) and 12.5 g of tetraethylorthosilicate (TEOS 98%, CAS 78-10-4) under stirring for 2 h. The gel had a composition given by:

0.025 mol CTAB 1.5 mol methanol 0.3235 mol NH$_4$OH 10.42 mol H$_2$O

The molar ratio of the surfactant to the cosolvent was about 0.016:1 and the molar ratio of the surfactant to the hydrolysis catalyst was about 0.076:1. The resulting solid was recovered by filtration and dried in vacuum. The product was calcined at 550° C. for 2 h in nitrogen first, then in air for 4 h.

The calcined product proved to have a surface area of 1365 m$^2$/g, a pore volume of 0.82 ml/g and a mean pore diameter of 2.4 nm. The x-ray diffraction pattern was similar to those illustrated by FIG. 1B, and the particle shape was similar to the one described for Example 10.

EXAMPLE 12

Following the initial step of Example 2, 2.11 g of methanol (99%, CAS 67-56-1), 0.23 g of NH$_4$OH (28%, CAS 1336-21-5) and 0.25 g of tetraethylorthosilicate (TEOS 98%, CAS 78-10-4) were combined sequentially. The resulting gel was dried by evaporation at 40° C. for 2 h in an oven. The resulting gel had a composition as follows:

0.49245×10$^{-3}$ mol CTAB

64×10$^{-3}$ mol methanol 6.47×10$^{-3}$ mol NH$_4$OH 208.3×10$^{-3}$ mol H$_2$O The resulting solid was then calcinced at 550° C. for 2 h under nitrogen, followed by 4 h in air. The calcined product proved to have a surface area of 1561 m$^2$/g, a pore volume of 0.78 ml/g and a mean pore diameter of 2.0 nm. The calcined product of this example exhibited a broad x-ray peak at 3.27 nm as illustrated by FIG. 1B and the elliptical particle shape and inner structure were similar to those described in Example 10.

EXAMPLE 13

105.76 g of methanol (99%, CAS 71-23-8), 11.5 g of NH$_4$OH (28%, CAS 1336-21-5) and 12.5 g of tetraethylorthosilicate (TEOS 98%, CAS 78-10-4) were added sequentially to an aqueous solution of 187.5 ml containing 4.5 wt % CTAB under stirring for 2 h. The gel was formed after a few minutes and it had a composition as follows:
  0.025 mol CTAB
  3.2 mol methanol
  0.3235 mol NH$_4$OH
  10.42 mol H$_2$O The gel was recovered by filtration and it was dried in vacuum. The product was calcined at 550° C. for 2 h under nitrogen, then in air for 4 h.

The calcined product proved to have a surface area of 1561 m$^2$/g, a pore volume of 0.78 ml/g and a mean pore diameter of 2.0 nm. The x-ray diffraction profile of this material was similar to those illustrated in FIG. 1B, while the TEM micrographs indicated an elliptical particle shape similar to that described in Example 10.

EXAMPLE 14

3.75 g of a solution containing 4.5 wt % CTAB were injected into a well containing 1.74 g of acetone (99.5%, CAS 67-64-1) and 0.23 grams of NH$_4$OH (28%, CAS 1336-21-5) together with 0.25 g of tetraethylorthosilicate (TEOS 98%, CAS 78-10-4), using a liquid handling robot, as in Example 2. The resulting gel was heated at 40° C. for 2 h, afterwards it was evaporated until dryness at 40° C. in an oven. The gel had an overall composition as follows:
  0.49245×10$^{-3}$ mol CTAB
  30×10$^{-3}$ mol acetone
  6.47×10$^{-3}$ mol NH$_4$OH
  208.3×10$^{-3}$ mol H$_2$O The molar ratio of the surfactant to cosolvent was about 0.016:1 and the molar ratio of the surfactant to hydrolysis catalyst was about 0.076:1. The resulting solid was then calcined at 550° C. for 2 h under nitrogen, followed by 4 h in air. The calcined product has a surface area of 1016 m$^2$/g, a pore volume of 0.6 ml/g and a mean pore diameter of 2.3 nm. The x-ray diffraction profile was similar to those illustrated by FIG. 1B. The TEM micrographs of this material indicated the particle shape and inner structure similar to those described in Example 10.

EXAMPLE 15

87.12 g of acetone (99.5%, CAS 67-64-1), 11.5 g of NH$_4$OH (28%, CAS 1336-21-5) and 12.5 g of tetraethylorthosilicate (TEOS 98%, CAS 78-10-4) were added sequentially to an aqueous solution of 187.5 ml containing 4.5 wt % CTAB under stirring for 2 h. The gel was formed after a few minutes and it had composition as follows:
  0.025 mol CTAB
  1.5 mol acetone
  0.3235 mol NH$_4$OH
  10.42 mol H$_2$O The molar ratio of the surfactant to the cosolvent was about 0.016:1 and the molar ratio of the surfactant to hydrolysis catalyst was about 0.076:1. The gel was recovered by filtration and it was dried in vacuum. The product was calcined at 550° C. for 2 h under nitrogen, then in air for 4 h.

The calcined product proved to have a surface area of 1099 m$^2$/g, a pore volume of 0.63 ml/g and a mean pore diameter of 2.3 nm. The x-ray diffraction pattern profile was similar to those illustrated in FIG. 1B, while the TEM micrographs indicated an elliptical particle shape similar to that described in Example 10.

EXAMPLE 16

3.75 g of a solution containing 4.5 wt % of CTAB was injected into a well containing 4.70 g of acetone (99.5%, CAS 67-64-1), 0.23 g of NH$_4$OH (28%, CAS 1336-21-5) and 0.25 g of tetraethylorthosilicate (TEOS 98%, CAS 78-10-4) using a liquid handling robot, as in Example 2. The resulting gel was heated at 40° C. for 2 h, afterwards it was evaporated until dryness at 40° C. in an oven. The gel had an overall composition as follows:
  0.49245×10$^{-3}$ mol CTAB
  81×10$^{-3}$ mol acetone
  6.47×10$^{-3}$ mol NH$_4$OH
  208.3×10$^{-3}$ mol H$_2$O The molar ratio of the surfactant to cosolvent is about 0.006:1 and the molar ratio of the surfactant to hydrolysis catalyst is about 0.076:1. The resulting solid was then calcined at 550° C. for 2 h under nitrogen, followed by 4 h in air. The calcined product has a surface area of 1065 m$^2$/g, a pore volume of 0.64 ml/g and a mean pore diameter of 2.4 nm. The x-ray diffraction profile was similar to those illustrated by FIG. 1B. The TEM micrographs of this material indicated the elliptical particle shape and inner structure similar to those describe in Example 10.

EXAMPLE 17

235.2 g of acetone (99.5%, CAS 67-64-1), 11.5 g of NH$_4$OH (28%, CAS 1336-21-5) and 12.5 g of tetraethylorthosilicate (TEOS 98%, CAS 78-10-4) were added sequentially to an aqueous solution of 187.5 ml containing 4.5 wt % CTAB under stirring for 2 h. The gel was formed after a few minutes and it had a composition given by:
  0.025 mol CTAB
  4.05 mol acetone
  0.3235 mol NH$_4$OH
  10.42 mol H$_2$O The molar ratio of the surfactant to the cosolvent was about 0.023:1 and the molar ratio of the surfactant to the hydrolysis catalyst was about 0.076:1. The gel was recovered by filtration and it was dried in vacuum. The product was calcined at 550° C. for 2 h under nitrogen, then in air for 4 h.

The calcined product has a surface area of 1133 m$^2$/g, a pore volume of 0.71 ml/g and a mean pore diameter of 2.5 nm. The x-ray diffraction profile was similar to those illustrated in FIG. 1B, while the TEM micrographs indicated a particle shape similar to the one described in Example 10.

While various embodiments have been chosen to illustrate the invention, it will be understood that modifications and changes can be made without departing from the scope of the invention as defined in the appended claims.

What is claimed is:

1. A mesoporous material comprising spherical silica particles having a diameter of between 0.1 and 1.0 micron, said silica particles having an inner structure formed by chain stacks aligned substantially along the radius of the spherical particle, each of said chain stacks having pores interconnected with pores of an adjacent chain stack to form a nanotube structure in which pores of said nanotube structure extend in a substantially radial direction with respect to a center of said silica particles, said nanotube structure having a mean pore diameter between about 2.0 nm and about 4.0 nm, as measured by nitrogen adsorption, said spherical silica particles having a surface area between about 750 and about 1,050 m$^2$/g and a mean pore volume between about 0.75 ml/g and about 1.0 ml/g.

2. The mesoporous material of claim 1, wherein said silica particles have the formula $SiO_2$-$M_2O_3$ where M is a trivalent metal.

3. The mesoporous material of claim 2, wherein M is selected from the group consisting of aluminum, gallium and lanthanide metals.

4. The mesoporous material of claim 1, wherein said pores have a mean diameter of about 3.5 nm.

5. A mesoporous material comprising silica particles having a substantially elliptical shape with a major axis and a minor axis, said silica particles having an inner structure formed by chain stacks, each of said chain stacks having pores interconnected with pores of an adjacent chain stack to define a plurality of nanotubes, said nanotubes being oriented substantially parallel to said major axis and having a mean pore diameter of about 2.0 nm to about 4.0 nm.

6. The mesoporous material of claim 5, wherein said particles have a surface area of about 1200 m$^2$/g to about 1561 m$^2$/g.

7. The mesoporous material of claim 6, wherein said particles have a pore volume of about 0.75 ml/g.

8. The mesoporous material of claim 7, wherein said nanotubes are oriented unidirectional.

9. The mesoporous material of claim 7, wherein said silica particles have the formula $SiO_2$-$M_2O_3$ where M is a trivalent metal.

10. The mesoporous material of claim 9, wherein M is selected from the group consisting of aluminum and gallium.

11. The mesoporous material of claim 9, wherein M is a lanthanide metal.

12. A process for producing mesoporous silica particles comprising the steps of:
reacting an aqueous mixture of a surfactant, an organic cosolvent, an hydrolysis catalyst agent and a silica source to form a gel, wherein said surfactant and cosolvent are present in a molar ratio of about 0.001:1 to about 0.01:1; and
drying and calcining said gel to form mesoporous silica particles having an inner structure formed by chain stacks, each of said chain stacks having pores interconnected with pores of an adjacent chain stack to define a plurality of nanotubes, wherein said nanotubes have a mean pore diameter of about 2.0 nm to about 4.0 nm, said surfactant, organic cosolvent, hydrolysis catalyst agent and silica source being used in amounts effective to form spherical silica particles in which pores of said nanotubes extend in a substantially radial direction with respect to a center of said silica particles or to form elliptical silica particles having a major axis and a minor axis in which nanotubes are oriented substantially parallel to said major axis.

13. The process of claim 12, wherein said surfactant and cosolvent are present in a molar ratio of about 0.008:1 to about 0.006:1.

14. The process of claim 12, wherein said surfactant is selected from the group consisting of anionic, cationic and nonionic surfactants.

15. The process of claim 12, wherein said aqueous mixture includes an aqueous solution and where said surfactant is present in an amount of about 1.0 w % to about 8.0 wt % based on the weight of said aqueous solution.

16. The process of claim 12, wherein said cosolvent is selected from the group consisting of methanol, ethanol, propanol, butanol and acetone.

17. The process of claim 12, wherein said cosolvent is selected from the group consisting of a lower alkyl ketone, a lower alcohol, and mixtures thereof.

18. The process of claim 12, wherein said surfactant is cetyltrimethylammonium bromide and said hydrolysis catalyst is aqueous ammonium hydroxide.

19. The process of claim 12, wherein said surfactant and said hydrolysis catalyst are present in a molar ratio of about 0.07:1 to about 0.09:1.

20. The process of claim 12, wherein said cosolvent is a polar solvent having a surface tension and dielectric constant less than water, and where said polar solvent is present in an amount sufficient to lower the surface tension and dielectric constant of said aqueous mixture.

21. The process of claim 12, wherein said silica source comprises silica, an organosilicate, a silica metal oxide and mixtures thereof, where said silica metal oxide has the formula $SiO_2$-$MO_x$ where M is a trivalent metal.

22. The process of claim 21, wherein said trivalent metal is selected from the group consisting of $Al^{+3}$, $Ga^{+3}$ and $La^{+3}$.

23. The process of claim 22, wherein said aqueous mixture further contains $Al(NO_3)_3$ and where said silica particles have the formula $SiO_2$-$MO_x$ where M is $Al^{+3}$.

24. The silica particles obtained by the process of claim 12, wherein said particles have a substantially spherical shape, a particle size of about 0.1 to about 1.0 microns and a surface area of about 750 m$^2$/g to about 1050 m$^2$/g.

25. The silica particles of claim 24, wherein said particles have a pore volume of about 0.75 ml/g to about 1.0 ml/g.

26. The silica particles obtained by the process of claim 12, wherein said particles have an elliptical shape with a particle size of about 0.1 microns to about 1.0 microns and a surface area of about 1,000 m$^2$/g to about 1561 m$^2$/g.

27. The silica particles of claim 26, wherein said pores of said nanotubes have a mean pore size of about 2.0 nm to about 4.0 nm.

28. The silica particles of claim 26, wherein said particles have a pore volume of about 0.75 ml/g.

29. The process of claim 12, wherein said aqueous mixture further comprises at least one compound selected from the group consisting of sodium aluminate, sodium gallate, a lanthanide metal nitrate and a lanthanide metal chloride and where said silica particles have the formula $SiO_2$-$MO_x$ where M is $Al^{+3}$, $Ga^{+3}$, or a trivalent lanthanide metal.

30. The process of claim 12, wherein said silica source is an organosilicate.

31. The process of claim 30, wherein said organosilicate is tetraethylorthosilicate.

32. The process of claim 12, wherein said silica source sodium metasilicate.

33. The process of claim 12, wherein said cosolvent is selected from the group consisting of methanol, acetone and mixtures thereof, and where said mesoporous particles are elliptical with pores extending substantially parallel to a major axis of said particles.

34. The process of claim 33, wherein said surfactant and cosolvent are included in said aqueous mixture in a molar ratio of about 0.009:1 to about 0.023:1.

35. The process of claim 33, wherein said aqueous mixture comprises said surfactant and said hydrolysis catalyst agent in a molar ratio of about 0.09:1 to about 0.07:1.

36. The process of claim 12, wherein said cosolvent is selected from the group consisting of ethanol, propanol and mixtures thereof, and where said mesoporous particles are spherical with pores in a substantially radial direction with respect to a center of said particles.

37. The process of claim 35, wherein said surfactant and cosolvent are present in said aqueous mixture in a molar ratio of about 0.008:1 to about 0.006:1.

38. The process of claim 36, wherein said aqueous mixture comprises said surfactant and said hydrolysis catalyst in a molar ratio of about 0.09:1 to about 0.07:1.

* * * * *